(No Model.)
W. WEBSTER.
GRAZING POST.
No. 261,112. Patented July 11, 1882.
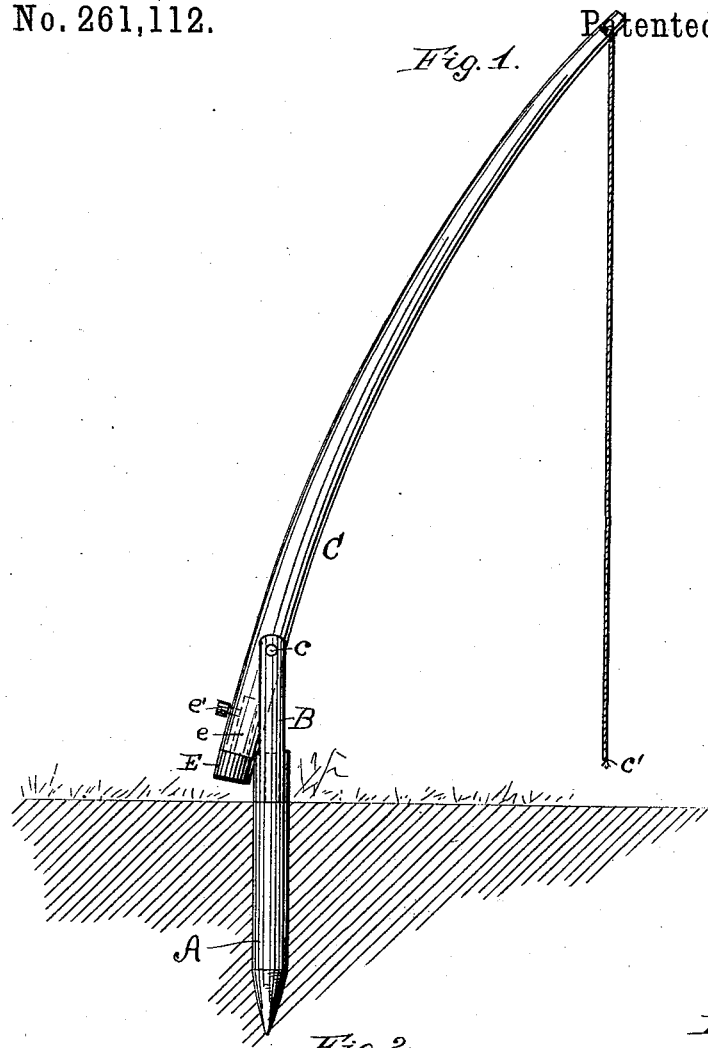
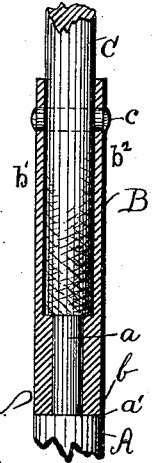
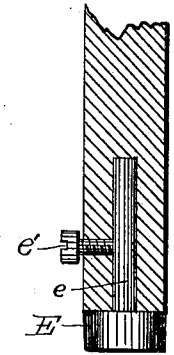
Witnesses:
J. V. Garner
W. A. Craig
Inventor:
Wm. Webster
By H. J. Ennis
Atty.

United States Patent Office.

WILLIAM WEBSTER, OF PACOLETT DEPOT, SOUTH CAROLINA.

GRAZING-POST.

SPECIFICATION forming part of Letters Patent No. 261,112, dated July 11, 1882.

Application filed March 27, 1882. (No model.)

*To all whom it may concern:*

Be it known that I, WILLIAM WEBSTER, a citizen of the United States, residing at Pacolett Depot, in the county of Spartansburg and State of South Carolina, have invented certain new and useful Improvements in Grazing-Posts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to grazing-poles for horses and cattle; and the novelty consists in the construction of the same, as will be hereinafter more fully described, and particularly pointed out in the claim.

In the accompanying drawings similar letters of reference indicate like parts of the invention.

Figure 1 is a view in perspective of my improved grazing-pole; Fig. 2, a detached section of the swivel-joint; and Fig. 3, a detail view, partly in section, showing the adjustable counterbalance.

A is post, pointed at its lower end to facilitate its insertion in the ground, and the upper part is cut away so as to form a spindle, $a$, and square shoulder $a'$.

B is a shoe or socket provided with a bearing, $b$, which fits over the spindle $a$, so that it may freely revolve upon it. The upper part of this socket B is cut away on opposite sides, so as to leave two standards, $b'$ $b^2$, between which is swung the long tapering pole C, pivoted thereto by the bolt $c$.

To the upper end of the pole C is attached the tethering cord or halter $c'$. To the lower end of said pole is attached a weight, E, provided with a rod, $e$, inserted into the end of the pole, and secured thereto by the set-screw $e'$.

It will readily be seen that the set-screw may be loosened, and the weight E adjusted with reference to the leverage of the pole C to suit the conditions of the animals tethered thereto.

The device, as a whole, is neat and sightly, as well as ornamental on the farm, and is an improvement on cumbersome and unsightly devices of this nature heretofore employed.

It will also be seen that in grazing the animal is allowed the full length of the tether, as well as the full length of the pole, and when the animal is at the limit of the space the pole is parallel with and close to the ground, thus bringing the securing-strain on the post A and overcoming all tendency to starting it in the ground.

Having thus fully described my invention, what I claim as new and useful, and desire to secure by Letters Patent of the United States, is—

The combination, with the pointed post A, having the pintle $a$, and the socket B, having standards $b'$ $b^2$, of the sweep C, pivoted thereto and provided with the weight E and shank $e$, adapted to be adjusted in the end of the sweep C by the screw $e'$, substantially as set forth.

In testimony whereof I affix my signature in presence of two witnesses.

WILLIAM WEBSTER.

Witnesses:
W. D. WILKINS,
H. C. SMITH.